(12) United States Patent
Schilling (10) Patent No.: US 8,205,426 B2
(45) Date of Patent: Jun. 26, 2012

(54) METHOD AND APPARATUS FOR OPERATING GAS TURBINE ENGINES

(75) Inventor: Jan Christopher Schilling, Middletown, OH (US)

(73) Assignee: General Electric Company, Schenectady, NY (US)

(*) Notice: Subject to any disclaimer, the term of this patent is extended or adjusted under 35 U.S.C. 154(b) by 1233 days.

(21) Appl. No.: 11/461,010

(22) Filed: Jul. 31, 2006

(65) Prior Publication Data

US 2010/0236213 A1   Sep. 23, 2010

(51) Int. Cl.
- F02G 3/00 (2006.01)
- F02K 3/02 (2006.01)
- B64D 15/04 (2006.01)

(52) U.S. Cl. .... 60/39.08; 60/262; 60/39.093; 244/134 R (58) Field of Classification Search ............... 60/226.1, 60/262, 266, 39.08, 39.093; 244/53 B, 134 R; 137/15.1

See application file for complete search history.

(56) References Cited

U.S. PATENT DOCUMENTS

| | | | |
|---|---|---|---|
| 3,834,157 A | 9/1974 | Hoffmann | |
| 4,346,786 A | 8/1982 | Midgley | |
| 4,574,584 A | 3/1986 | Hovan | |
| 4,782,658 A * | 11/1988 | Perry | 60/226.1 |
| 4,891,934 A | 1/1990 | Huelster | |
| 4,926,970 A | 5/1990 | Kimberlin | |
| 5,001,098 A * | 3/1991 | Pacaud et al. | 502/68 |
| 5,272,868 A | 12/1993 | Ciokajilo et al. | |
| 5,605,045 A | 2/1997 | Halimi et al. | |
| 5,807,454 A * | 9/1998 | Kawabe et al. | 156/214 |
| 5,944,287 A * | 8/1999 | Rodgers | 244/134 R |
| 6,470,666 B1 | 10/2002 | Przytulski et al. | |
| 6,530,227 B1 | 3/2003 | Young et al. | |
| 6,546,732 B1 | 4/2003 | Young et al. | |

(Continued)

FOREIGN PATENT DOCUMENTS

JP   49105014 A   10/1974

(Continued)

OTHER PUBLICATIONS

Japanese language Office Action for copending JP Patent Application No. 2007-186453 dated Oct. 4, 2011.

(Continued)

*Primary Examiner* — William H Rodriguez
*Assistant Examiner* — Young Choi
(74) *Attorney, Agent, or Firm* — David J. Clement, Esq.; Armstrong Teasdale LLP (57) ABSTRACT

A method for assembling a turbine engine to facilitate reducing an operating temperature of a lubrication fluid during engine operation, the gas turbine engine including a fan assembly, a booster downstream from the fan assembly, and a splitter circumscribing the booster. The method includes coupling a radially inner wall and a radially outer wall at a leading edge to form a splitter body, and coupling an inner support structure within the splitter body such that a cooling circuit is defined between at least a portion of the inner support structure and the inner and outer walls, said cooling circuit configured to circulate lubrication fluid therethrough such that as a temperature of the lubrication fluid is reduced and a temperature of at least a portion of the inner and outer walls is increased.

19 Claims, 7 Drawing Sheets

U.S. PATENT DOCUMENTS

| | | | |
|---|---|---|---|
| 6,561,760 B2 | 5/2003 | Wadia et al. | |
| 6,651,929 B2 | 11/2003 | Dionne | |
| 6,679,045 B2 | 1/2004 | Karafillis et al. | |
| 6,725,645 B1 * | 4/2004 | Wadia et al. | 60/226.1 |
| 6,799,112 B1 | 9/2004 | Carter et al. | |
| 7,055,303 B2 | 6/2006 | Macfarlane et al. | |
| 7,093,418 B2 | 8/2006 | Morris et al. | |
| 7,131,612 B2 * | 11/2006 | Baptist et al. | 244/134 R |
| 2005/0050877 A1 * | 3/2005 | Venkataramani et al. | 60/39.093 |
| 2006/0081419 A1 | 4/2006 | Care et al. | |
| 2007/0234704 A1 * | 10/2007 | Moniz et al. | 60/39.093 |

FOREIGN PATENT DOCUMENTS

| | | |
|---|---|---|
| JP | 56143525 U | 10/1981 |
| JP | 9071298 A | 3/1997 |
| JP | 2004124947 A | 4/2004 |

OTHER PUBLICATIONS

English language translation of JP Office Action for copending JP Patent Application No. 2007-186453 dated Oct. 4, 2011.

* cited by examiner

METHOD AND APPARATUS FOR OPERATING GAS TURBINE ENGINES

BACKGROUND OF THE INVENTION

This invention relates generally to gas turbine engines, and more particularly, to gas turbine engines and methods of assembling the same.

Gas turbine engines typically include low and high pressure compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as producing useful work to propel an aircraft in flight or to power a load, such as an electrical generator.

During engine operation, a lubrication system is used to lubricate gas turbine engine components. For example, the lubrication system is configured to channel lubrication fluid to various bearing assemblies within the gas turbine engine. During engine operation, the temperature of the lubricating fluid increases undesirably. The increase in the lubrication fluid temperature is caused by heat generated by sliding and rolling friction of components like bearings, gears, and seals within a sump and also from heat-conduction through the sump walls due to hot air surrounding the sump enclosure. The lubrication fluid lubricates the components and removes heat from the components which results in an increased lubricant temperature.

To facilitate a reduction in the operational temperature of the lubrication fluid and cause the fluid to more effectively lubricate components and improve heat removal capability within the gas turbine engine, at least one known gas turbine engine utilizes a heat exchanger that is coupled to the engine proximate to the cowl region. More specifically, the heat exchanger is coupled to the engine within a channel that extends between the fan cowl and the core gas turbine engine. During operation, airflow is channeled through the heat exchanger to facilitate reducing the operational temperature of the lubrication fluid. However, since the airflow in the exhaust flowpath is at the same approximate relative pressure as the airflow in the inlet flowpath, the exhaust must be behind the throat of the fan nozzle. As such, when the gas turbine engine is operating during relatively low thrust conditions there is little pressure difference between the heat exchanger airflow inlet and the heat exchanger airflow outlet. To compensate for the relatively low airflow differential through the heat exchanger, at least one gas turbine engine includes a relatively large heat exchanger having a relatively large surface area to facilitate channeling an increased quantity of airflow through the heat exchanger to more effectively cool the lubrication fluid channeled therethrough. Accordingly, reducing the operating temperature of the lubrication fluid utilizing a known heat exchanger may increase the cost of the gas turbine engine assembly and may also increase the weight of the gas turbine engine assembly thus reducing overall engine efficiency.

BRIEF SUMMARY OF THE INVENTION

In one aspect, a method for assembling a turbine engine to facilitate reducing an operating temperature of a lubrication fluid during engine operation is provided. The gas turbine engine including a fan assembly, a booster downstream from the fan assembly, and a splitter circumscribing the booster. The method includes coupling a radially inner wall and a radially outer wall at a leading edge to form a splitter body, and coupling an inner support structure within the splitter body such that a cooling circuit is defined between at least a portion of the inner support structure and the inner and outer walls, the cooling circuit configured to circulate lubrication fluid therethrough such that as a temperature of the lubrication fluid is reduced a temperature of at least a portion of the inner and outer walls is increased.

In another aspect, a splitter for a gas turbine engine is provided. The splitter includes a radially inner wall, a radially outer wall connected to the radially inner wall at a leading edge, an inner support structure coupled between the inner and outer walls such that a flowpath is defined between at least a portion of the inner support structure and the inner and outer walls, and a cooling circuit extending through a portion of the inner support structure for circulating lubrication fluid through the flowpath such that as a temperature of the lubrication oil is reduced and a temperature of at least a portion of the inner and outer walls is increased.

In a further aspect, a gas turbine engine assembly is provided. The gas turbine engine assembly includes a fan assembly, a booster downstream from the fan assembly, and a splitter circumscribing the booster. The splitter includes a radially inner wall, a radially outer wall connected to the radially inner wall at a leading edge, an inner support structure coupled between the inner and outer walls such that a flowpath is defined between at least a portion of the inner support structure and the inner and outer walls, and a cooling circuit extending through a portion of the inner support structure for circulating lubrication fluid through the flowpath such that as a temperature of the lubrication oil is reduced and a temperature of at least a portion of the inner and outer walls is increased.

DETAILED DESCRIPTION OF THE INVENTION

Figure 1:
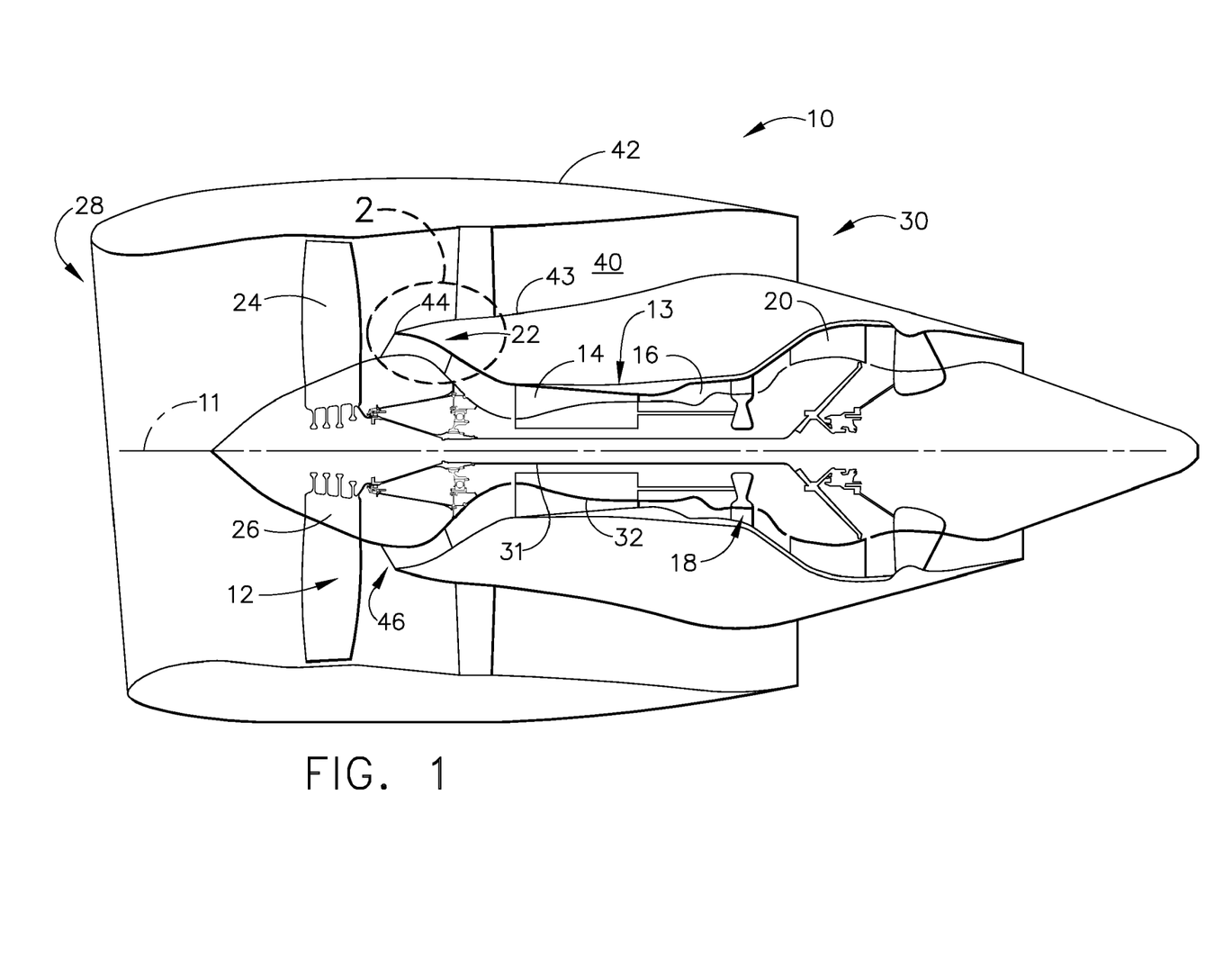
FIG. 1 is schematic illustration of an exemplary gas turbine engine.

FIG. 1 is a schematic illustration of an exemplary gas turbine engine assembly 10 having a longitudinal axis 11. Gas turbine engine assembly 10 includes a fan assembly 12, and a core gas turbine engine 13 that includes a high pressure compressor 14, a combustor 16, and a high pressure turbine 18. In the exemplary embodiment, gas turbine engine assembly 10 also includes a low pressure turbine 20 and a multi-stage booster compressor 22 also referred to as an intermediate pressure compressor.

Fan assembly 12 includes an array of fan blades 24 extending radially outward from a rotor disk 26. Engine 10 has an intake side 28 and an exhaust side 30. In the exemplary embodiment, gas turbine engine 10 is a GE90 gas turbine engine that is available from General Electric Company, Cincinnati, Ohio. Fan assembly 12, booster 22, and low-pressure turbine 20 are coupled together by a first rotor shaft 31, and compressor 14 and high-pressure turbine 18 are coupled together by a second rotor shaft 32.

In the exemplary embodiment, gas turbine engine assembly 10 also includes a plurality of bearing assemblies 36 (shown in FIG. 3) that are utilized to provide rotational support to a plurality of rotating components within gas turbine engine 10 such as, but not limited to, fan assembly 12, compressor 14, high-pressure turbine 18, low-pressure turbine 20, booster 22, first shaft 31, and second shaft 32. Optionally, gas turbine engine 10 may also include a gearbox assembly 38 (shown in FIG. 3) that may be utilized to drive various gas turbine engine 10 accessories and/or various components of the aircraft such as, but not limited to fan assembly 12 and booster 22.

In operation, air flows through fan assembly 12 and booster 22 supplying the high pressure compressor 14. The booster discharge air is channeled to compressor 14 wherein the airflow is further compressed and delivered to combustor 16. Fuel is added to the high pressure air in combustor 16 and ignited, expanding to drive turbines 18 and 20, and turbine 20 is utilized to drive fan assembly 12 and booster 22 by way of shaft 31. Engine 10 is operable at a range of operating conditions between design operating conditions and off-design operating conditions.

In the exemplary embodiment, gas turbine engine 10 includes a bypass duct 40 that is utilized to bypass a portion of the airflow from fan assembly 12 around core gas turbine engine 13. More specifically, bypass duct 40 extends between an outer fan casing 42 and a booster casing 43 that substantially circumscribes booster 22. Specifically, gas turbine engine 10 includes a splitter assembly 44 that is utilized to channel a first portion of the airflow compressed by fan assembly 12 through bypass duct 40 and also channel a second portion of the airflow compressed by fan assembly 12 through booster 22 via a booster inlet 46.

Figure 2:
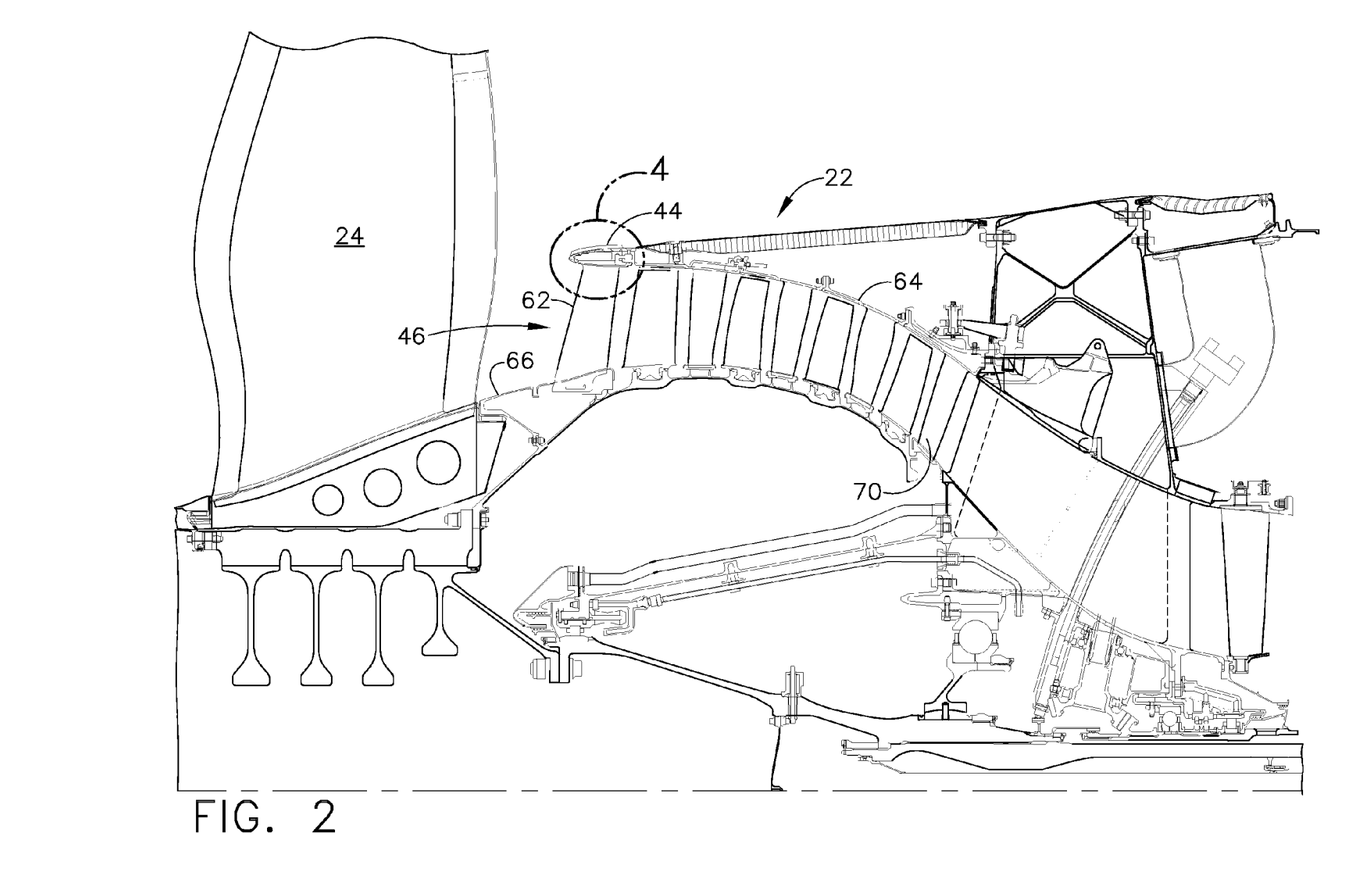
FIG. 2 is a side view of a portion of the gas turbine engine shown in FIG. 1 including an exemplary splitter assembly.

FIG. 2 is an enlarged illustration of a portion of gas turbine engine 10 and taken along area 2 (shown in FIG. 1). As shown in FIG. 2, booster 22 includes a plurality of circumferentially-spaced inlet guide vanes (IGV) 62. IGV assemblies 62 extend between an outer structural casing 64 and a center hub 66 to facilitate channeling airflow entering gas turbine engine 10 downstream through booster 22. In the exemplary embodiment, booster 22 also includes a plurality of outlet guide vane (OGV) assemblies 70 which extend between outer structural casing 64 and center hub 66.

Figure 3:
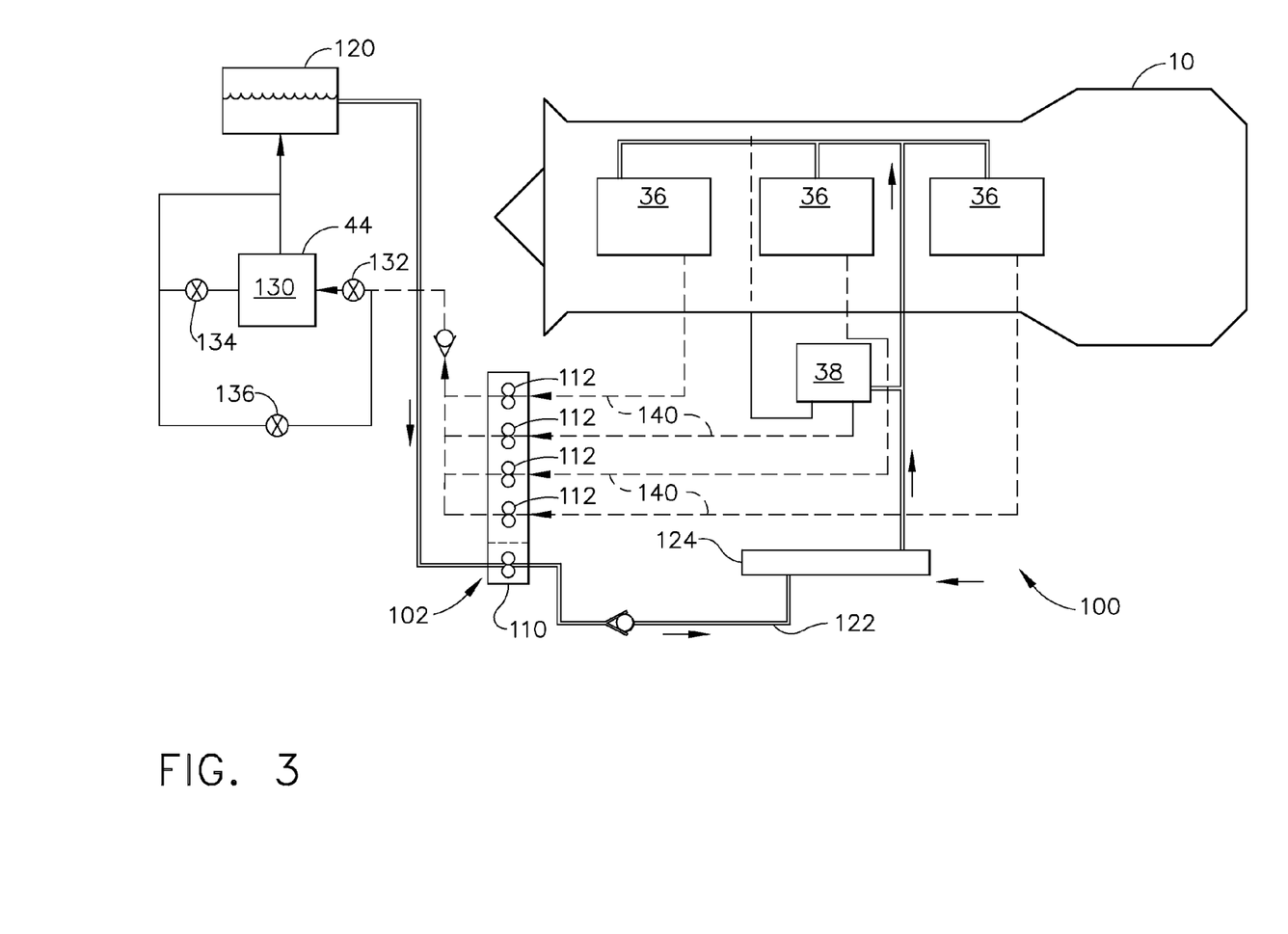
FIG. 3 is a schematic illustration of an exemplary lubrication system including the splitter assembly shown in FIG. 2 that may be utilized with the gas turbine engine shown in FIG. 1.

FIG. 3 is a simplified schematic illustration of an exemplary lubrication fluid supply and scavenge system 100 that may be utilized with a gas turbine engine, such as gas turbine engine assembly 10 (shown in FIG. 1). In the exemplary embodiment, system 100 includes a lubrication fluid supply/scavenge pump assembly 102 that is configured to supply lubrication fluid to a plurality of gas turbine engine assembly 10 components such as, but not limited to, bearing assemblies 36 and gearbox 38. In the exemplary embodiment, lubrication fluid supply/scavenge pump assembly 102 includes at least one lubrication fluid supply pump element 110 and a plurality of lubrication fluid scavenge pump elements 112. System 100 also includes a lubrication fluid supply source 120, a lubrication fluid supply manifold 122 that is coupled to lubrication fluid supply pump element 110, and a lubrication fluid filter 124. In the exemplary embodiment, system 100 also includes at least one heat exchanger 130 that is operationally coupled between the discharge side of scavenge pump elements 112 and supply source 120. In the exemplary embodiment, heat exchanger 130 includes an inlet valve 132, and outlet valve 134, and a bypass valve 136 that may be either manually or electrically operated.

During operation, lubrication fluid supply pump element 110 is activated such that the lubrication fluid is channeled from supply source 120, through supply manifold 122, to filter 124. The lubrication fluid is then channeled from filter 124 to gas turbine engine assembly 10 to facilitate lubricating and cooling various components within gas turbine engine 10. A plurality of scavenge lines 140 are utilized to channel the lubrication fluid from a plurality of bearing sumps within gas turbine engine assembly 10 back to supply source 120 utilizing scavenge pump elements 112, via heat exchanger 130.

In the exemplary embodiment, heat exchanger 130 is formed integrally with splitter 44 as will be described in more detail below. Accordingly, during operation, lubrication fluid is channeled to splitter 44, i.e. heat exchanger 130, at a first operational temperature. The lubrication fluid is then channeled through splitter 44 such that the operational temperature of the lubrication fluid is decreased and such that the temperature of the external surfaces of splitter 44 are increased. As such, splitter 44, including heat exchanger 130, facilitates reducing the operational temperature of the lubrication fluid channeled therethrough and therefore functions as a heat exchanger to cool the oil. Moreover, channeling the lubrication fluid through splitter 44 facilitates increasing the temperature of the external surfaces of splitter 44 and, as such, facilitates reducing and/or eliminating ice formation on the external surface of splitter 44.

Figure 4:
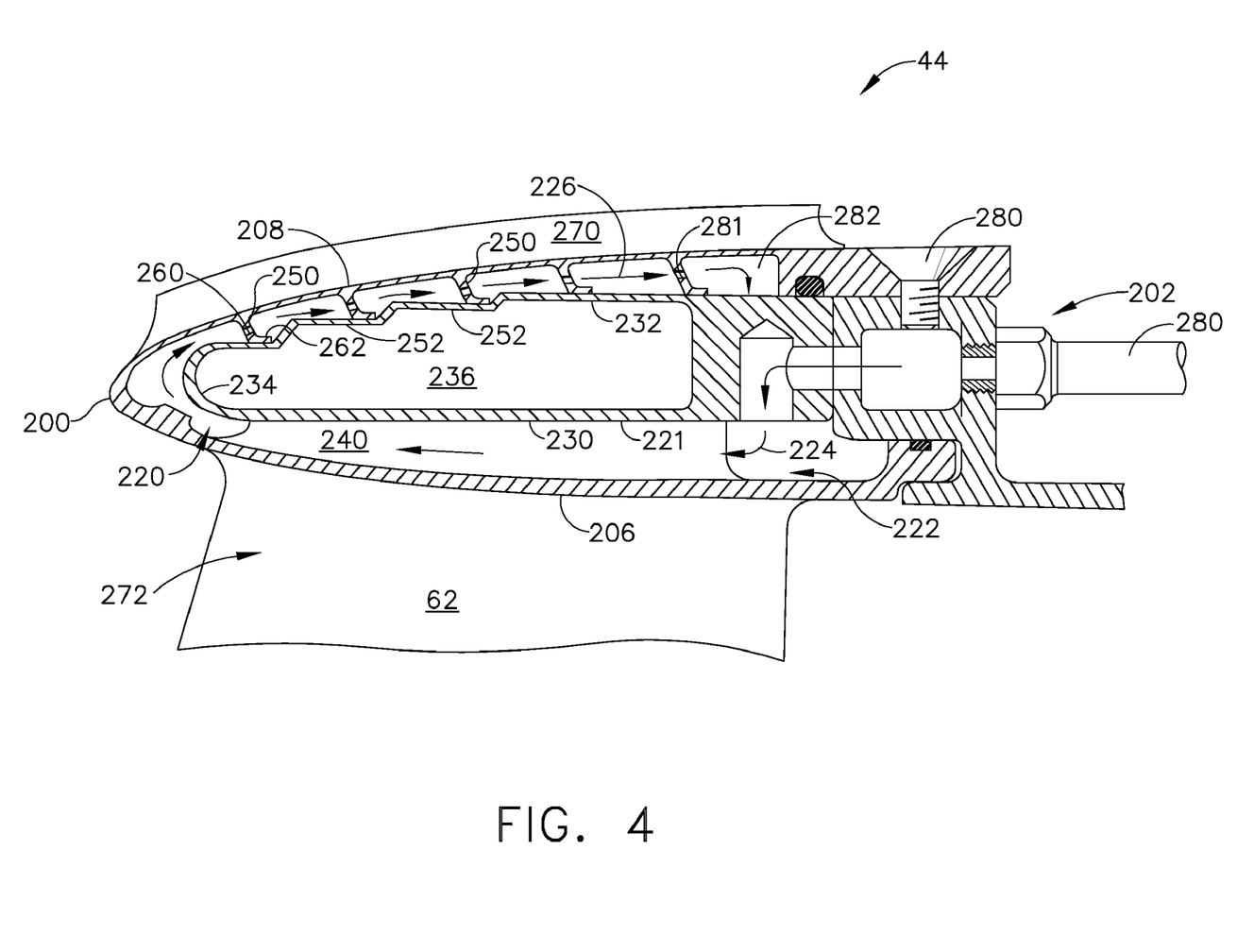
FIG. 4 is a side view of the upper portion of the exemplary splitter assembly shown in FIG. 2.
Figure 5:
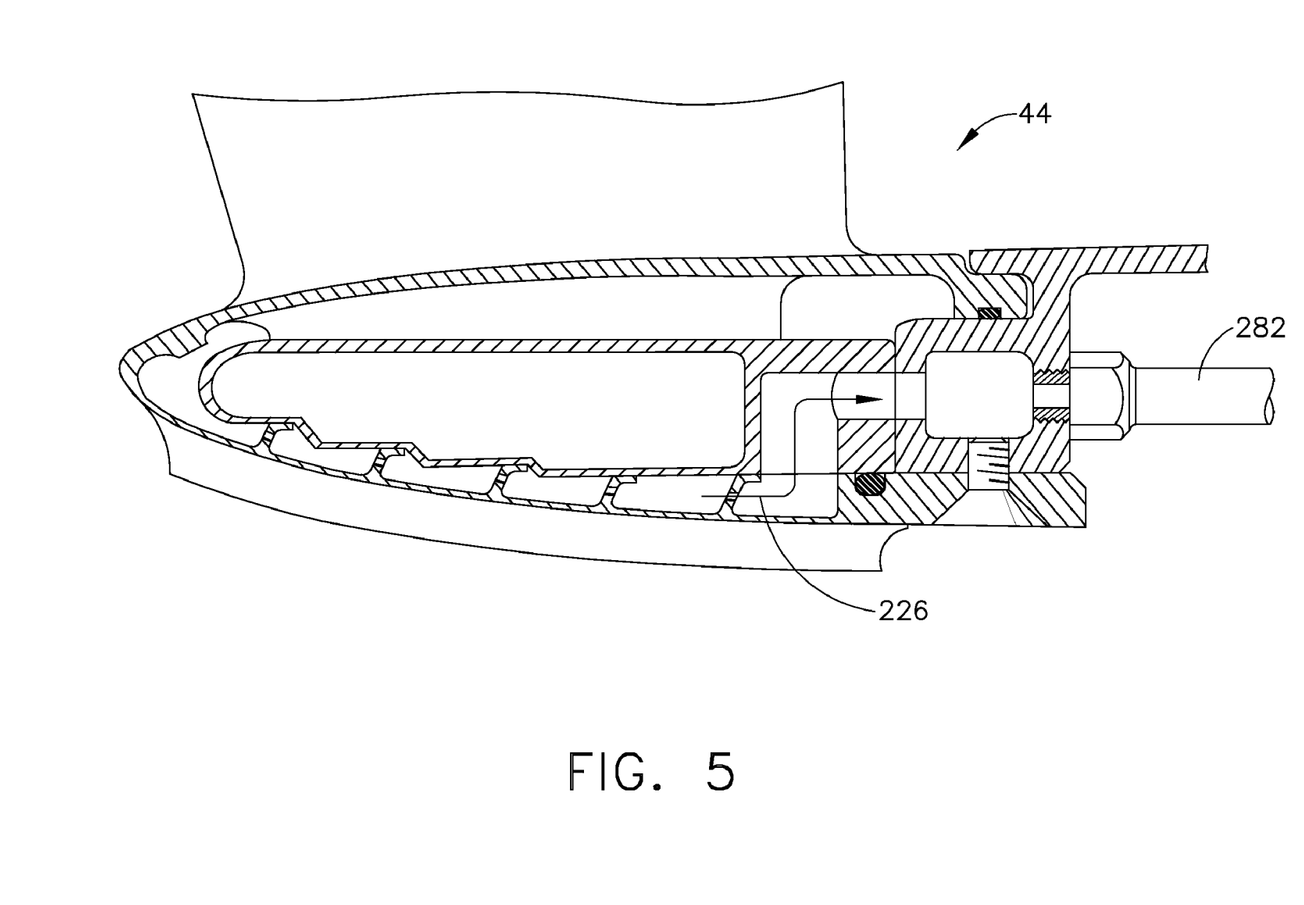
FIG. 5 is a side view of the lower portion of the exemplary splitter assembly shown in FIG. 2.

FIG. 4 is a cross-sectional view of the upper portion of the splitter 44 shown in FIG. 2. FIG. 5 is a side view of the lower portion of the exemplary splitter assembly shown in FIG. 2. In the exemplary embodiment, splitter 44 includes a leading edge 200, an axially opposite trailing edge 202, a radially inner wall 206, and a radially outer wall 208 that each extend between leading edge 200 and trailing edge 202. In one embodiment, splitter 44 is aerodynamically streamlined for minimizing flow obstruction.

Splitter 44 includes an inner support structure 220 that is coupled within splitter 44 to facilitate providing structural support for splitter 44 and also facilitates providing a lubrication channel or cooling circuit 222 through splitter 44. In one embodiment, inner support structure 220 is formed unitarily with splitter 44 utilizing a casting procedure for example. Optionally, inner support structure 220 is fabricated as a separate component and coupled within splitter 44 utilizing a welding or brazing procedure, for example.

In the exemplary embodiment, support structure 220 includes a central portion 221 that includes a radially inner portion 230, a radially outer portion 232 and a substantially U-shaped portion 234 that is coupled to or formed with inner and outer portions 230 and 232 such that central portion 221 has a substantially U-shaped cross-sectional profile defining a hollow cavity 236 therein. Support structure 220 also includes a plurality of structural members or fins 240 that are coupled between radially inner portion central portion 221 and radially inner wall 206. Members 240 extend longitudinally along centerline axis 11 (shown in FIG. 1). Although, splitter 44 is shown in cross-section, it should be realized that each member 240 is separated by an adjacent member 240 such that a first portion 224 of lubrication channel 222 is defined between adjacent members 240.

Support structure 220 also includes a plurality of structural members 250 that extend radially around centerline axis 11.

In the exemplary embodiment, radially outer portion 232 is formed with a plurality of steps 252 such that radially outer portion 232 substantially follows the contour of radially outer wall 208. Optionally, radially outer portion 232 is formed with a contour that substantially matches the contour of radially outer wall 208. In the exemplary embodiment, structural members 250 each include a first portion 260 and a second portion 262 that is coupled to or formed unitarily with first portion 260 such that each structural member 250 has a substantially L-shaped cross-sectional profile. During assembly, structural members 250 are coupled between central portion 221 and radially outer wall 208 to facilitate providing structural support to splitter 44 and to facilitate defining a second portion 226 of lubrication channel 222 therethrough.

In the exemplary embodiment, splitter 44 also includes a plurality of rib stiffeners 270 that are coupled to an external surface of radially outer wall 208 and extend longitudinally along centerline axis 11 (shown in FIG. 1). As shown in FIG. 4, rib stiffeners 270 have a relatively low profile that is configured to substantially match the swirl angle of the fan discharge airflow to enhance cooling. Moreover, rib stiffeners 270 function as stiffeners for the outer splitter wall 208 allowing outer splitter wall 208 to be fabricated utilizing a relatively thin material thus improving heat transfer from the lubrication fluid channeled through splitter 44 to an outer surface of splitter 44.

During operation, the lubrication fluid supply pump element 110 is activated such that the lubrication fluid is channeled from supply source 120, through supply manifold 122, to filter 124. The lubrication fluid is then channeled from filter 124 to gas turbine engine assembly 10 to facilitate lubricating various components within gas turbine engine 10. The heated lubrication fluid is then channeled through splitter 44, i.e. heat exchanger 130, to facilitate reducing the operational temperature of the lubrication fluid. More specifically, the lubrication fluid is channeled through a splitter lubrication supply inlet 280 and then through the first channel portion 224 axially forward within splitter 44 and then axially aft through second channel portion 226 via a plurality of openings 281 extending through or between structural members 250. As such, the lubrication fluid is channeled both circumferentially and axially through splitter 44. The cooled lubrication fluid is then channeled through a discharge opening 282 (shown in FIG. 5) in splitter 44 and channeled back to supply source 120.

Thus in the exemplary embodiment, the gas turbine return oil supply is utilized as a heat source to facilitate increasing an operating temperature of the splitter leading edge, and therefore facilitate preventing ice accretion and/or mitigate ice formation, on and/or along the splitter leading edge. Moreover, fabricating splitter 44 such that splitter 44 may be utilized as a heat exchanger facilitates reducing the operating temperature of the lubrication fluid channeled therethrough. As such, the gas turbine engine may operate under a wider variety of operating conditions without the need to provide a relatively large heat exchanger, thus reducing the weight of the gas turbine engine assembly and increasing the overall engine efficiency.

Figure 6:
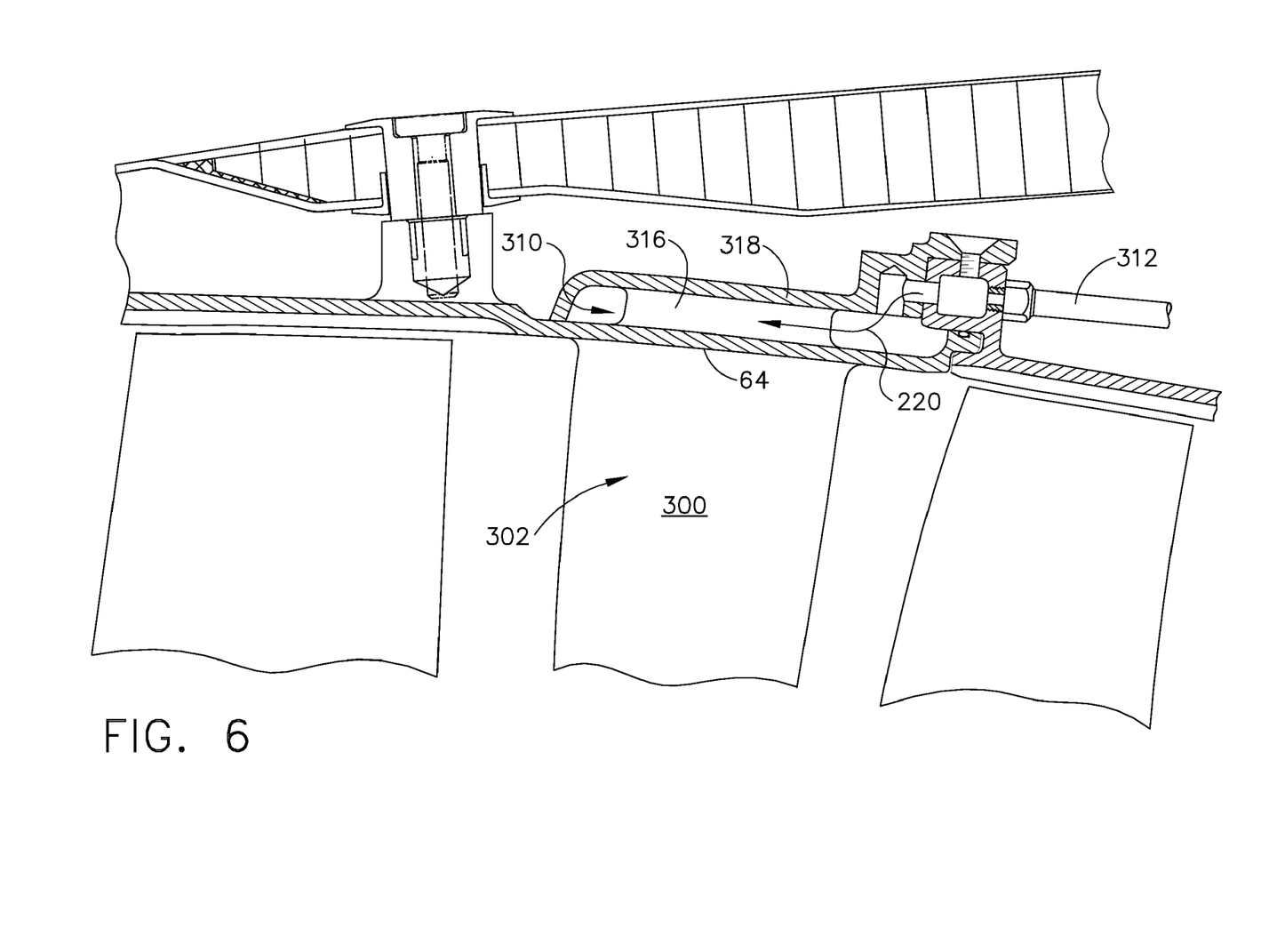
FIG. 6 is a cross-sectional view of the upper portion of the exemplary booster stator vane assembly.
Figure 7:
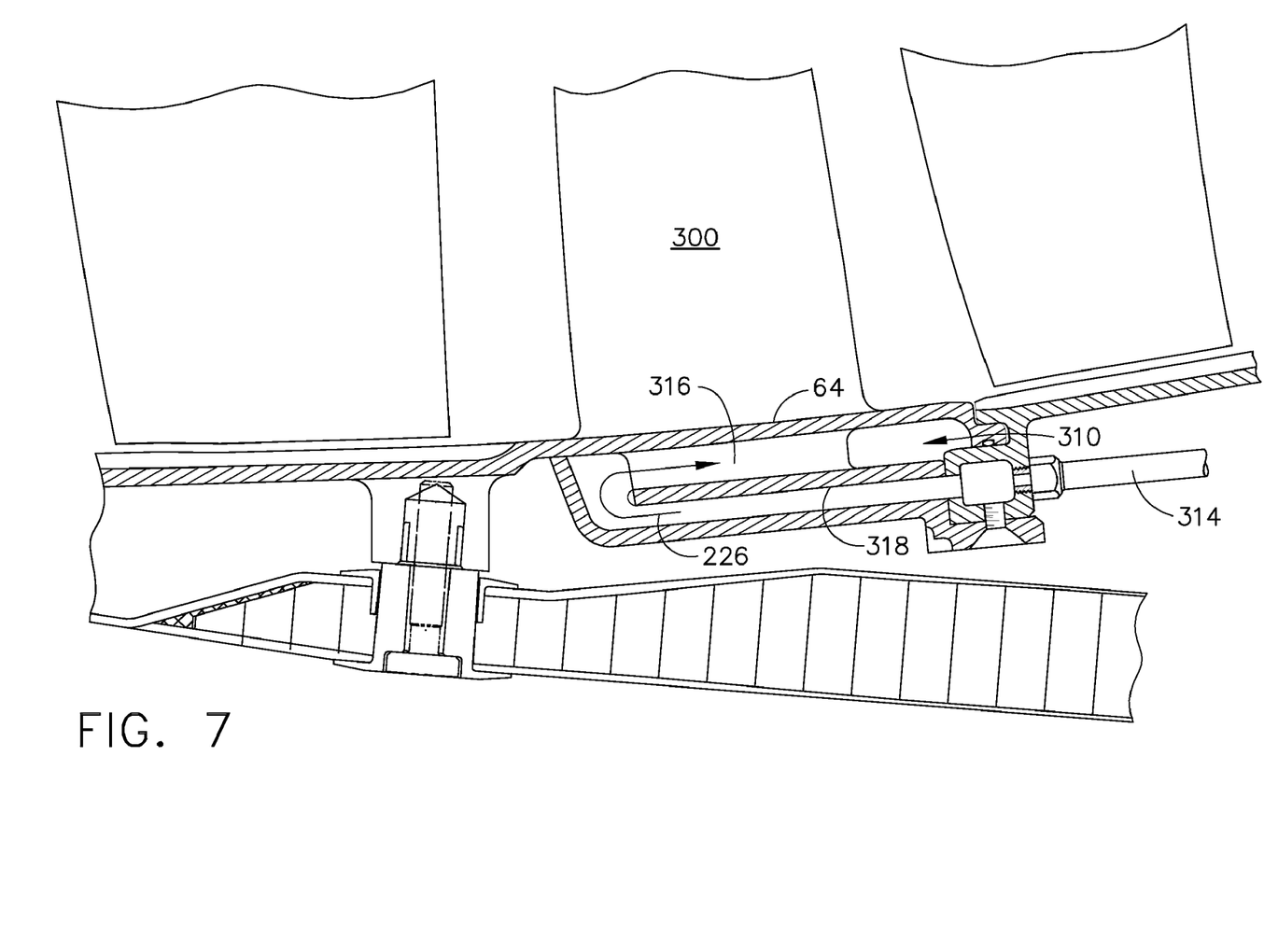
FIG. 7 is a cross-sectional view of the lower portion of the exemplary stator vane assembly shown in FIG. 6. splitter assembly shown in FIG. 2.

FIG. 6 is a cross-sectional view of the upper portion of the exemplary booster stator vane assembly and FIG. 7 is a cross-sectional view of the lower portion of the exemplary stator vane assembly shown in FIG. 6. In this embodiment, gas turbine engine 10 includes a booster 22 that includes a substantially hollow second stator stage 300 to supplement cooling of the lubrication fluid channeled through splitter 44. For example, if additional cooling of the lubrication fluid is desired, oil is channeled from supply source 120 second stage 300 to facilitate further reducing the operational temperature of the oil prior to the oil being returned to supply source 120. Utilizing second stator stage 300 facilitates further improving heat transfer due to the higher velocity air moving across the airfoil and casing surfaces.

In the exemplary embodiment, gas turbine engine 10 includes a stator supply manifold 310 that includes an lubrication inlet 312 and a lubrication outlet 314 and a plurality of stiffeners or strut extensions 316 that are coupled between outer structural casing 64 and a supply manifold portion 318. As shown in FIGS. 6 and 7, stiffeners 316 have a relatively low profile and may be configured at an angle to facilitate increasing heat transfer between the lubrication fluid channeled through the manifold 310 and the outer structural casing 64 and thus reduce ice buildup on the outer structural casing 64.

During operation, the lubrication fluid supply pump element 110 is activated such that the lubrication fluid is channeled from supply source 120, through supply manifold 122, to filter 124. The lubrication fluid is then channeled from filter 124 to gas turbine engine assembly 10 to facilitate lubricating various components within gas turbine engine 10. The heated lubrication fluid is then channeled through stator supply manifold 310 via inlet 312. The lubrication fluid is then directed circumferentially around the gas turbine engine utilizing stator supply manifold 310. After the heat transfer is complete, the spent lubrication fluid is then channeled through discharge opening 314 back to the lubrication system.

Described herein is a splitter assembly that may be utilized as a heat exchanger to reduce the operating temperature of the lubrication fluid channeled therethrough. As such, the surface temperature of the splitter is increased to facilitate reducing and/or preventing ice accretion on an external surface of the splitter. Specifically, the splitter is a 360 degree shell forming the inner flowpath for the fan duct. During use, relatively hot oil is channeled through the splitter to both heat the splitter and cool the oil. Moreover, since airflow is channeled both radially outwardly and inwardly past the splitter, the inlet guide vanes 62 function as heat sinks or cooling fins to further reduce the operating temperature of the oil. In the exemplary embodiment, the splitter may also include a plurality of fins coupled to or formed with the splitter outer surface that provide stiffening to the splitter thus allowing the splitter outer wall to be fabricated utilizing a relatively thin material thus further improving the overall heat transfer from the hot oil through splitter walls.

The above-described splitter including an integral heat exchanger is cost-effective and highly reliable in facilitating the prevention of ice accumulation along exposed surfaces of the engine. More specifically, the splitter enables heat to be transferred from the lubrication fluid to the exterior surfaces of the splitter thereby heating the splitter to facilitate reducing and or eliminating ice accretion of the splitter whenever the engine is operating and without requiring the use of an external control system. Furthermore, because compressor bleed air is not utilized for anti-icing the splitter, engine performance is not adversely affected by the ice protection system described herein.

While the invention has been described in terms of various specific embodiments, those skilled in the art will recognize that the invention can be practiced with modification within the spirit and scope of the claims.

What is claimed is:

1. A method for assembling a gas turbine engine including a nacelle and a core engine disposed within the nacelle to define a core engine flow path through the core engine and a bypass duct between the core engine and the nacelle, said method comprising:

forming a splitter that defines a cooling circuit;

coupling the splitter to the core engine such that the splitter is configured to split a flow of air between the bypass duct and the core engine flow path, the cooling circuit configured to circulate lubrication fluid through the splitter such that a temperature of the lubrication fluid is reduced and a temperature of the splitter is increased; and providing a booster compressor of the gas turbine engine with at least one substantially hollow stator vane configured to receive lubrication fluid channeled from the splitter via forced circulation induced by at least one fluid pumping device.

2. A method in accordance with claim 1 wherein forming a splitter comprises:

coupling a radially inner wall and a radially outer wall to form a splitter body;

coupling a radially inner portion to a radially outer portion at a leading edge to form a substantially U-shaped central portion; and coupling a plurality of longitudinal structural members between the central portion and the inner wall such that a first flowpath portion is defined between the central portion and the inner wall.

3. A method in accordance with claim 1 wherein forming a splitter comprises:

coupling a radially inner wall and a radially outer wall to form a splitter body;

coupling a radially inner portion to a radially outer portion at a leading edge to form a substantially U-shaped central portion; and coupling a plurality of radial structural members between the central portion and the outer wall such that a second flowpath portion is defined between the central portion and the outer wall.

4. A method in accordance with claim 3 wherein coupling a radially inner portion to a radially outer portion at a leading edge further comprises:

coupling the radially inner portion including a plurality of steps to the radially outer portion to form the substantially U-shaped central portion; and coupling a plurality of substantially L-shaped radial structural members between the stepped inner portion and the outer wall.

5. A method in accordance with claim 3 further comprising coupling a plurality of stiffeners to an external surface of the outer wall, each stiffener having a profile that is configured to substantially match a swirl angle of a fan discharge airflow.

6. A method in accordance with claim 2 further comprising coupling inner wall to an inlet guide vane to utilize the inlet guide vane as a heat sink to reduce the temperature of the lubrication fluid channeled through the splitter.

7. A splitter for a gas turbine engine including a nacelle and a core engine disposed within the nacelle to define a core engine flow path through the core engine and a bypass duct between the core engine and the nacelle, said splitter comprising:

a radially inner wall;

a radially outer wall connected to said radially inner wall at a leading edge;

an inner support structure coupled between said inner and outer walls such that a flowpath is defined between at least a portion of said inner support structure and said inner and outer walls; and a plurality of cooling circuits extending through a portion of the core engine for circulating lubrication fluid therethrough, wherein said plurality of cooling circuits are coupled in flow communication with at least one pumping device, said splitter configured to be coupled to:

said core engine to split a flow of air between the core engine flowpath and the bypass duct while reducing a temperature of the lubrication fluid and increasing a temperature of at least a portion of said inner and outer walls; and at least one substantially hollow stator vane of a booster compressor of the gas turbine engine, the at least one substantially hollow stator vane configured to receive lubrication fluid channeled from said splitter via said at least one pumping device.

8. A splitter in accordance with claim 7 wherein said inner support structure further comprises:

a central portion; and a plurality of longitudinal structural members coupled between said central portion and said inner wall.

9. A splitter in accordance with claim 8 wherein said cooling circuit comprises a first flowpath portion that is defined between said central portion and said inner wall.

10. A splitter in accordance with claim 7 wherein said inner support structure further comprises:

a central portion; and a plurality of radial structural members coupled between said central portion and said outer wall.

11. A splitter in accordance with claim 10 wherein said cooling circuit comprises a second flowpath portion that is defined between said central portion and said outer wall.

12. A splitter in accordance with claim 7 further comprising a plurality of stiffeners coupled to an external surface of said outer wall, each said stiffener having a profile that is configured to substantially match a swirl angle of a fan discharge airflow to enhance heat transfer.

13. A splitter in accordance with claim 7 wherein said inner wall is configured to be coupled to an inlet guide vane such that the inlet guide vane is utilized as a heat sink to reduce the temperature of the lubrication fluid channeled through said splitter.

14. A gas turbine engine comprising:

a nacelle;

a core engine disposed within said nacelle to define a core engine flow path through said core engine and a bypass duct between said core engine and said nacelle;

a booster compressor disposed within said nacelle, said booster compressor comprises at least one substantially hollow stator vane;

at least one lubrication fluid pumping device;

a splitter coupled to said core engine to split a flow of air between the core engine flow path and the bypass duct, said splitter comprising a first cooling circuit configured to circulate lubrication fluid via said at least one lubrication fluid pumping device such that a temperature of the lubrication fluid is reduced and a temperature of at least a portion of said splitter is increased, said splitter configured to circulate a portion of the lubrication fluid to said at least one substantially hollow stator vane of said booster compressor.

15. A gas turbine engine in accordance with claim 14 wherein said splitter further comprises a radially inner wall, a radially outer wall connected to said radially inner wall at a leading edge, and an inner support structure comprising a central portion and a plurality of longitudinal structural members coupled between said central portion and said inner wall such that a first flowpath portion is defined between said longitudinal structural members, said central portion, and said inner wall.

16. A gas turbine engine in accordance with claim 14 wherein said splitter further comprises a radially inner wall, a radially outer wall connected to said radially inner wall at a leading edge, and an inner support structure comprising a central portion and a plurality of radial structural members coupled between said central portion and said outer wall such that a second flowpath portion is defined between said radial structural members, said central portion, and said outer wall.

17. A gas turbine engine in accordance with claim 14 wherein said splitter further comprises a radially inner wall, a radially outer wall connected to said radially inner wall at a leading edge, and a plurality of stiffeners coupled to an external surface of said outer wall, each said stiffener having a profile that is configured to substantially match a swirl angle of a fan discharge airflow to enhance heat transfer.

18. A gas turbine engine in accordance with claim 14 wherein said splitter further comprises a radially inner wall and a radially outer wall connected to said radially inner wall at a leading edge, said inner wall coupled to an inlet guide vane to utilize said inlet guide vane as a heat sink to reduce the temperature of the lubrication fluid channeled through said splitter.

19. A gas turbine engine in accordance with claim 14 further comprising a booster compressor that comprises at least one substantially hollow stator vane configured to receive lubrication fluid channeled from said splitter.

* * * * *